United States Patent
Vertegaal

[15] 3,668,738
[45] June 13, 1972

[54] DEVICE FOR MAKING A LONGITUDINAL CUT INTO THE NECK OF POULTRY

[72] Inventor: Jacobus G. Vertegaal, Boxmeer, Netherlands

[73] Assignee: Stork Amsterdam N.V., Amstelveen, Netherlands

[22] Filed: Feb. 26, 1970

[21] Appl. No.: 14,494

[30] Foreign Application Priority Data

March 25, 1969 Netherlands..........................6904551

[52] U.S. Cl.............................................................17/11
[51] Int. Cl.......................................................A22c 21/00
[58] Field of Search.........................17/11, 12; 146/166, 167

[56] References Cited
UNITED STATES PATENTS 3,364,515  1/1968  Brown et al................................17/11
3,405,423  10/1968  Vertegaal...................................17/11

FOREIGN PATENTS OR APPLICATIONS 69,756  11/1969  Germany...................................17/12

Primary Examiner—Lucie H. Laudenslager
Attorney—Irving M. Weiner

[57] ABSTRACT

A device for making a longitudinal cut into the back of the neck of poultry by means of a rotating disc provided along its circumference with outwardly protruding knives, separated by downwardly and outwardly protruding guide members the whole cooperating with a fixed guide and having an inclined position with respect to the horizontal.

4 Claims, 4 Drawing Figures

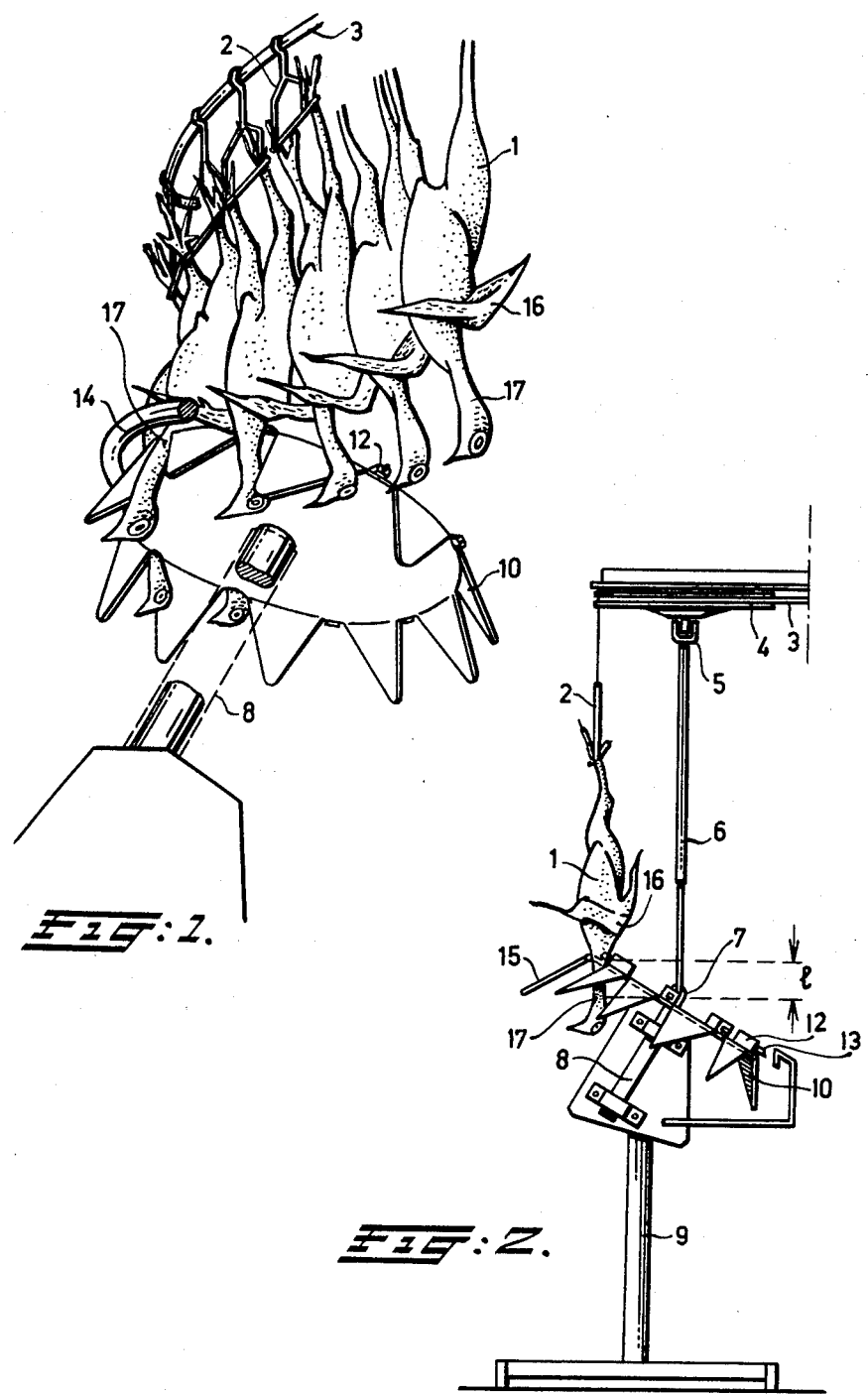

PATENTED JUN 13 1972

INVENTOR
JACOBUS GERARDUS VERTEGAAL
BY
Irving M. Weiner
ATTORNEY 3,668,738

DEVICE FOR MAKING A LONGITUDINAL CUT INTO THE NECK OF POULTRY

BACKGROUND OF THE INVENTION

When poultry is slaughtered and further treated in a continuous process, the poultry being moved along hanging by its legs on a conveyor track, it is necessary that at a particular stage a longitudinal cut, extending from the shoulder as far as the head, is made into the neck and on the backside thereof, of the poultry. This cut makes it possible to remove at a later stage in one single operation the wind pipe, the crop and the organs connected therewith.

SUMMARY OF THE INVENTION

It is an object of the invention to provide a device to make this cut in the neck of the poultry, thereby obviating the need of handling the poultry by personnel.

The device according to my invention comprises a driven, rotating disc of which the circumferential velocity is equal to the velocity of the conveyor track and which is provided with a plurality of outwardly protruding knives, regularly spaced along the circumference, of which the mutual spacing is equal to the mutual spacing of the birds on the track, while between every two knives a slantwise downwardly and outwardly protruding guide member is provided, while in front of and below the disc a arcuate guide rod is disposed which extends approximately along a quarter of the circumference of the disc, the disc and arcuate guide being positioned at an angle with respect to the horizontal.

The birds, which are hung by their legs from shackles affixed to a conveyor track, are moved forwardly along the track and are always caught, due to the positioning of the disc with respect to the shackles, by the neck between two guide members of the disc and thereupon between the disc and the arcuate guide rod in front thereof and lower. As a result the wings are lifted by the guide members and the neck of the poultry is pressed inbetween the guide rod and the edge of the disc. Independently of variations in the length of the bird, the point of the knife protruding beyond the disc is thereafter pressed through the neck skin of the bird at the moment in which this knife reaches the highest point of its path; on further movement of the disc, whereby the bird is taken along the circumference but the body remains at the same level the point of the knife moves, due to the slanting position of the disc, again downwards and cuts open the neck, whereafter the bird clears the disc.

The disc is preferably recessed at the location of the knife so that the neck can be better positioned.

According to my invention the guide members are preferably constituted by substantially triangular teeth made of plate material, while the knives are preferably adjustably accomodated in clamping pieces which are detachably accomodated in knife holders provided on the disc. The latter feature allows for a fast interchange of the knives.

BRIEF DESCRIPTION OF THE FIGURES.

FIG. 1 is a perspective view in which the principal parts of the device according to the invention are represented in outline;

FIG. 2 shows in outline a side elevation of the device;

DETAILED DESCRIPTION

Figure 3:
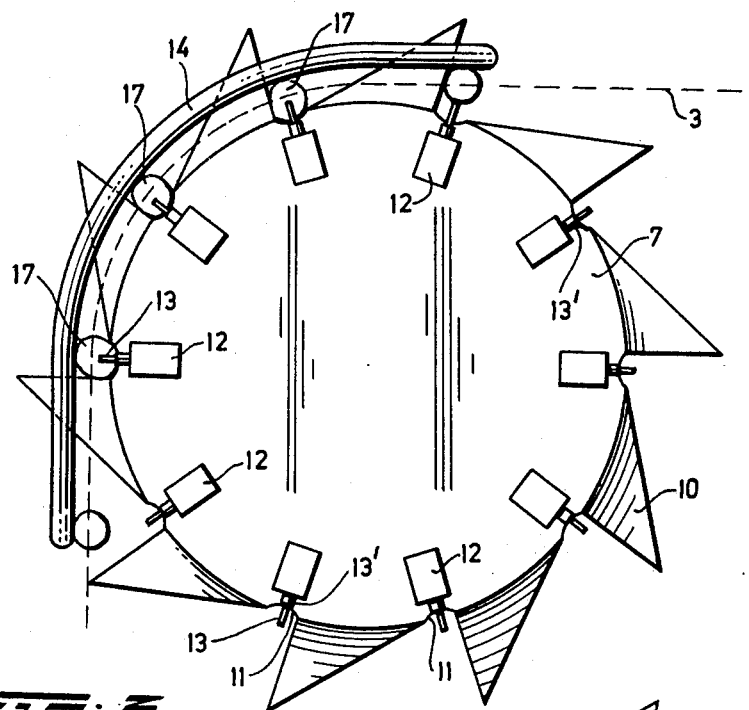
FIG. 3 is a plan view of the disc with guide members and the guide rod.
Figure 4:
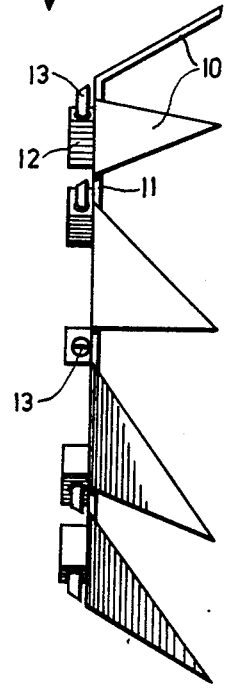
FIG. 4 is a side elevation of this disc.

The poultry to be treated is moved forwardly to the device while hanging by its legs on the usual shackles 2 of the conveyor track 3; the poultry is hanging with its breast forward. The device is placed on a point where the movement of the conveyor track changes its direction over 90°. This change of direction is caused by the guide wheel 4, driven by the conveyor track, which drives the device via the universal joint 5 and the driving rod 6, the latter being provided with a sliding coupling.

The device according to the invention comprises a disc 7 which is rotatably supported in a bearing bush 8, which is supported by the frame 9 in such a way that the distance from the center of the disc to the conveyor track 3 and also the angular position in two orientation directions can be adjusted at will. The disc carries along its circumference guide members or teeth 10 of triangular shape (see FIG. 3) which are slantwise outwards and downwards directed. Recesses 11 are provided in the disc and between the teeth and at the location of these recesses knife-holders 12 are disposed in the disc, from each of which protrudes outwardly the point of a knife 13. Before and slightly below the disc there is a bent guide rod 14 extending over 90° along the circumference of the disc, while a protective plate 15 is secured to the rod. A plane through this guide rod 14 has the same angular position as the disc 7.

The device operates as follows:

The birds 1 which are moved forward by the conveyor track 3 are caught one after another by the neck between two adjacent teeth 10. The wings 16 are pushed upwards by the teeth 10, but the downwards hanging neck is caught eventually between the guide rod 14 and the disc 7. The neck 17 is then partially situated in a recess 11. This situation is ensured when the edge of the disc 7 is at its highest point; simultaneously the point of the knife 13 is pushed into the neck of the bird. The co-operation of the outer edge of the disc 7 and the guide rod 14 situated in front thereof and slightly lower has as a result that the point of the knife always at the correct place, viz. slightly below the shoulders, is thrust into the neck and, within particular limits, independently of the size of the bird; the height of the disc is namely adjusted in dependence of the size of the smallest birds to be treated and bigger birds are pushed upwards by the guide rod.

Since the circumferential velocity of the disc corresponds with the linear velocity of the conveyor track, no movement in the peripheral direction of the bird with respect to the disc takes place, but, due to the inclined position of the disc, a displacement in the vertical direction of the knives with respect to the neck of the bird does take place. As a result the neck is slitted over the desired distance.

This distance is indicated by the letter L in FIG. 2.

When the bird has travelled along a quarter of the circumference of a circle, the point of the knife automatically clears the neck and the bird is further conveyed by the conveyor track.

The knives 13 are preferably provided in clamping pieces 13' which by a simple operation can be secured in the knife holders 12. In this way it becomes possible to have a number of knives in stock which previously have been adjusted in clamping pieces 13', so that blunt knives can be replaced fast with other knives without it being necessary to adjust on the machine the distance for which the knife protrudes from the disc.

Having thus described my invention what is claimed as new and desired to be secured by Letters Patent is:

1. A device for making a longitudinal cut into the back of the neck of poultry, which comprises:
   a moveable conveyor track from which poultry are hung by their feet at spaced apart intervals;
   means to drive said conveyor track;
   a rotatably mounted disc;
   means to drive said disc to cause it to rotate;
   a plurality of circumferentially spaced guide members associated with said disc to protrude slantwise downwardly and outwardly from said disc;
   a plurality of circumferentially spaced apart knives affixed to said disc between said spaced apart guide members to protrude outwardly therefrom, the distance between adjacent knives being equal to the interval between adjacent poultry hung from said conveyor track; and
   an arcuate guide rod extending approximately one-quarter of the circumference of said disc disposed concentrically, with, in front of, and below said disc, said disc and arcuate guide rod being positioned at an angle with a horizontal plane.

2. A device according to claim 1, characterized in that said disc is recessed at the locations of said knives.

3. A device according to claim 1, wherein said knives are adjustably mounted in clamping pieces which are detachable mounted in knife holders which are mounted on said disc.

4. A device according to claim 3, characterized in that substantially triangular teeth constitute said guide members.

* * * * *